United States Patent [19]

Forte

[11] 4,452,561
[45] Jun. 5, 1984

[54] RAILWAY WHEEL LIFTER AND INVERTER

[75] Inventor: Henry R. Forte, Highland, Calif.

[73] Assignee: AMSTED Industries Incorporated, Chicago, Ill.

[21] Appl. No.: 350,305

[22] Filed: Feb. 19, 1982

[51] Int. Cl.³ ............................................. B65G 7/00
[52] U.S. Cl. .................................... 414/767; 198/404
[58] Field of Search ................................ 414/765–767, 414/761, 762, 773; 198/404, 408

[56] References Cited

U.S. PATENT DOCUMENTS

| | | | |
|---|---|---|---|
| 1,576,027 | 3/1926 | Becker | 414/767 |
| 2,160,581 | 5/1939 | Behnke | 414/767 X |
| 2,833,099 | 5/1958 | Rejsa | 198/408 X |
| 3,367,517 | 2/1968 | Dallape et al. | 198/404 X |

Primary Examiner—Stanley H. Tollberg
Attorney, Agent, or Firm—Edward J. Brosius; Fred P. Kostka

[57] ABSTRACT

A railway wheel lifter and inverter is provided. A railway wheel enters a receiver device from a wheel conveyor. The receiver device is rotated about a shaft such that the wheel is lifted to a second conveyor and is inverted in the process. A second receiver device is affixed to the same shaft such that a complete lifting and inverting operation is accomplished in a one-half rotation of the shaft.

1 Claim, 2 Drawing Figures

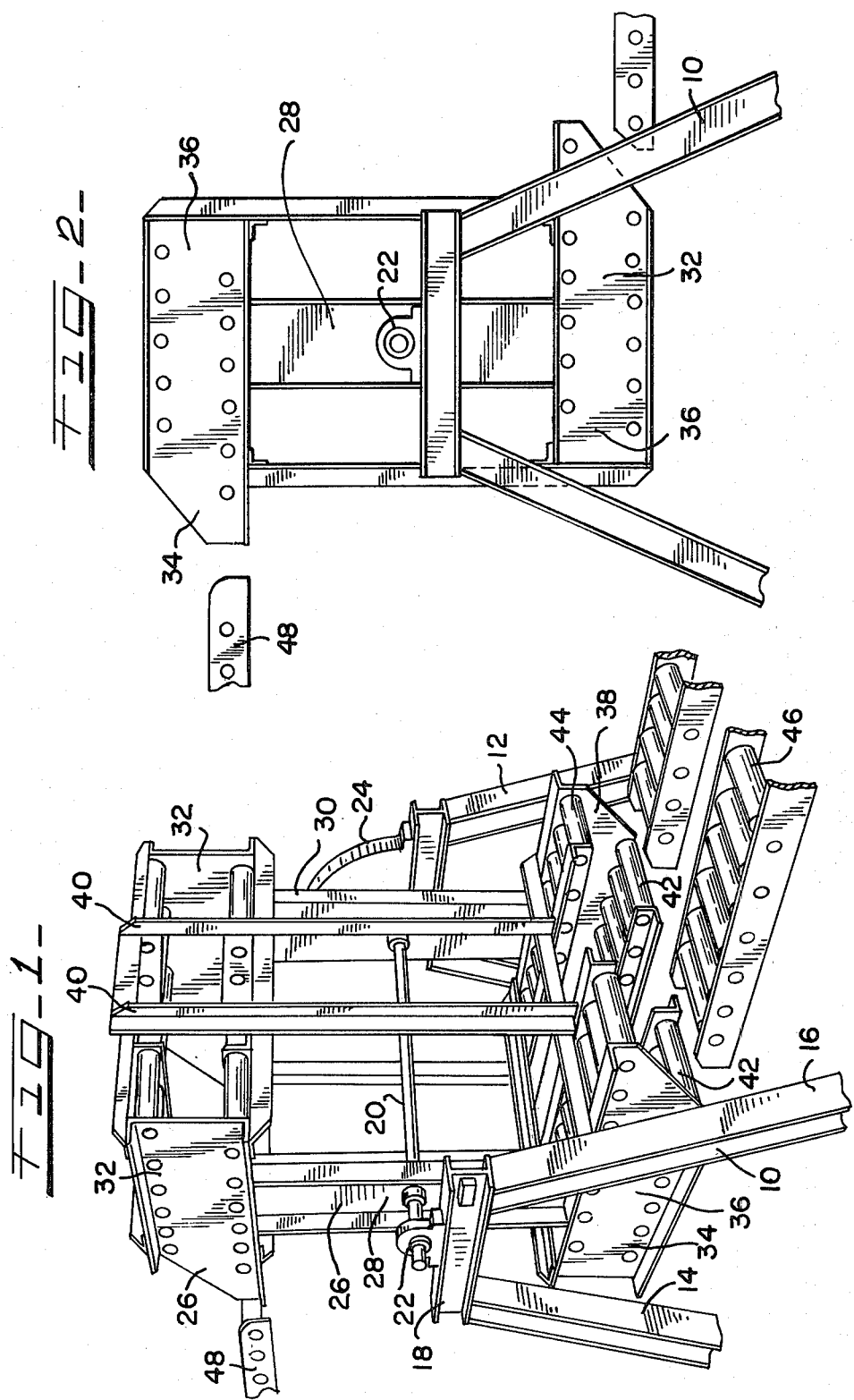

RAILWAY WHEEL LIFTER AND INVERTER

BACKGROUND OF THE INVENTION

The present invention relates generally to a device for lifting or lowering and inverting a railway wheel, and more specifically to a rotating device that receives, lifts and inverts a railway wheel.

In the casting of railway wheels, the wheels undergo a series of finishing operations after casting. These operations may include heat treating, rough-grinding, sprue cutting, magnetic particle and ultrasonic testing and finish grinding. The wheels are moved to these different operation stations throughout the foundry by a roller conveyor system. At several steps throughout the conveyor system it is necessary to invert the wheel, i.e., to change the side of the wheel which contacts the rollers so that the other side faces upwards for grinding, inspection or similar operations. Further, at several steps throughout the conveyor system it is necessary to raise or to lower the wheel to a different level conveyor. At certain steps in the conveyor system it is necessary to both invert and to raise or lower the wheel. Such inverting has been accomplished by a separate inverting machine, which receives the wheel from the roller conveyor, holds the wheel at top and bottom, and then rotates to invert the wheel. The subsequent raising or lowering of the wheel is accomplished by an elevator which receives the wheel from one roller conveyor, and then is raised or lowered by conventional hydraulic or electric elevator mechanisms to deliver the wheel to a different level conveyor. The elevator must return to the first level to receive a second wheel.

Accordingly it is an object of the present invention to provide an apparatus and a method for inverting and lifting or alternatively lowering a railway wheel from one conveyor level to another conveyor level.

SUMMARY OF THE INVENTION

The present invention provides an apparatus and a method for inverting and lifting or lowering a railway wheel from one conveyor level to another conveyor level.

A base structure is provided which is usually constructed from steel beams. The base structure comprises two side frames each of which rests on the floor or on a suitable base. A shaft is mounted on the top member of each side frame and joins the side frames to comprise the base structure. The shaft is rotatably mounted on each side frame, and is capable of being rotated by a rotating device such as an electric or a hydraulic motor.

A rotating structure is affixed to the shaft. Upon the rotation of the shaft, the rotating structure rotates with the shaft in a circular arc. This rotating structure comprises a central structural arrangement and two receiving devices affixed to each end thereof. Each receiving device is capable of receiving a railroad wheel. Further, each receiving device has a top with rollers, a bottom with rollers, an end wall and a front opening. The wheel is received through the front opening, slides on the bottom rollers and is kept from exiting by the end wall. When inverted, the wheel rolls out on the desired conveyor by rolling off of the top rollers, which have become the rollers upon which the wheel rests due to the rotation of the rotating structure about the shaft. The rotating structure is rotated about 180° to move one of the receiving devices containing the wheel from the receiving roller conveyor to the desired delivering roller conveyor. The second receiving device is thusly positioned at the receiving roller conveyor to receive a second wheel. No rotation of the rotating structure without a wheel in the receiving device is necessary at any stage of the process.

In particular, the present invention provides an apparatus for moving a railway wheel from a first roller conveyor to a second roller conveyor at a different height, said apparatus comprising a base structure, including leg sections and top sections, a shaft mounted on and joining said top sections, a central rotating structure mounted on said shaft, said central rotating structure including two end receiving structures each adapted to receive a railway wheel therein, and a device capable of rotating said central rotating structure so as to move a railway wheel located in one receiving structure from a first roller conveyor to a second roller conveyor.

BRIEF DESCRIPTION OF THE DRAWINGS

FIG. 1 is a perspective view of one embodiment of the railway wheel lifter and inverter of the present invention;

FIG. 2 is a side view of one embodiment of the railway wheel lifter and inverter of the present invention.

DESCRIPTION OF THE PREFERRED EMBODIMENT

A preferred embodiment of the present invention is shown in FIGS. 1 and 2. A base structure is shown comprising side frames 10 and 12. Side frame 10 includes leg members 14 and 16 and top member 18. Side frame 12 has similar leg members and top member. The lower ends of the leg members of both side frames rest on the floor or a suitable base structure.

Shaft 20 is rotatably mounted in shaft bearing 22 located on top member 18 and a similar bearing on the top member of side frame 12. A rotating device 24 is also mounted on side frame 12 to rotate shaft 20. Rotating device 24 is usually an electric or a hydraulic motor, or a flywheel driven by a belt or chain connected to a suitably mounted motor. A rotating structure 26 is affixed to shaft 20. Rotating structure 26 comprises main vertical beams 28 and 30, each of which has an opening to accommodate shaft 20. Wheel receiving devices 32 and 34 are mounted at both ends of main vertical beams 28 and 30. Each of receiving devices 32 and 34 comprise side walls 36 and 38, rear beam walls 40 and rollers 42 and 44.

As a wheel (not shown) exits from roller conveyor 46, it enters receiving device 34 by rolling on rollers 42. Shaft 20 is rotated by rotating device 24 approximately 180° and receiving device 24 is moved from the lower position to the upper position. The wheel is prevented from falling out of receiving device 34 by rear beam walls 40. As receiving device 34 is rotated to the upper position, the wheel is inverted, and now rests on rollers 44. In practice, at the upper position, rotating device 34 is stopped such that rollers 44 are not perfectly horizontal, but rather face downward toward roller conveyor 48. Thus the wheel rolls off of rollers 44 onto roller conveyor 48 automatically.

What is claimed is:

1. An apparatus for moving and inverting a railway wheel, said apparatus comprising a base structure including leg sections and top sections, a shaft mounted on and joining said top sections, a central rotating structure comprising a central structural assembly and two separated end receiving devices affixed one to each end of said central structural assembly, said central structural assembly being fixedly mounted on said shaft so as to be normal to and rotatable with said shaft, each end receiving device having a front opening disposed generally parallel to said shaft adapted to receive a railway wheel therein, and a device capable of rotating said central rotating structure so as to move and invert a railway wheel located in an end receiving device from one conveyor level to another conveyor level.

* * * * *